US011081985B2

(12) United States Patent
Hachiya (10) Patent No.: US 11,081,985 B2
(45) Date of Patent: Aug. 3, 2021

(54) SYNCHRONOUS ROTATING MACHINE CONTROL DEVICE AND MACHINE LEARNING DEVICE (71) Applicant: Mitsubishi Electric Corporation, Tokyo (JP)

(72) Inventor: Yosuke Hachiya, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/049,339

(22) PCT Filed: Jun. 21, 2018

(86) PCT No.: PCT/JP2018/023704
§ 371 (c)(1),
(2) Date: Oct. 21, 2020

(87) PCT Pub. No.: WO2019/244314
PCT Pub. Date: Dec. 26, 2019

(65) Prior Publication Data
US 2021/0058017 A1 Feb. 25, 2021

(51) Int. Cl.
*H02P 6/18* (2016.01)
*H02P 21/18* (2016.01)
*H02P 21/26* (2016.01)

(52) U.S. Cl.
CPC .............. *H02P 6/183* (2013.01); *H02P 21/18* (2016.02); *H02P 21/26* (2016.02); *H02P 2203/11* (2013.01)

(58) Field of Classification Search
CPC .... H02P 21/0014; H02P 23/0018; H02P 8/32; H02P 21/05; H02P 6/183; H02P 21/18;H02P 21/26; H02P 2203/11; G05B 2219/32334; G05B 2219/33056; G05B 2219/34082
See application file for complete search history.

(56) References Cited

U.S. PATENT DOCUMENTS 5,608,843 A * 3/1997 Baird, III ........... G05B 13/0265
706/25
9,977,411 B2 * 5/2018 Morita ................... G05B 11/01
(Continued)

FOREIGN PATENT DOCUMENTS

CN 204808687 U 11/2015
JP 7-245981 A 9/1995
(Continued)

OTHER PUBLICATIONS

International Search Report and Written Opinion dated Sep. 18, 2018 for PCT/JP2018/023704 filed on Jun. 21, 2018, 8 pages including English Translation of the International Search Report.
(Continued)

*Primary Examiner* — Bickey Dhakal
(74) *Attorney, Agent, or Firm* — Xsensus LLP (57) ABSTRACT

A machine learning device includes: a state observer that observes, as a state variable, at least one of driving noise of a synchronous rotating machine and an error with respect to a preset position of a rotational position of the synchronous rotating machine determined by driving voltage; and a learner that determines a value of a parameter on a basis of the state variable observed by the state observer. The learner includes: a reward calculator that calculates a reward on a basis of the state variable; and a function updater that determines the value of the parameter on a basis of the reward that has been calculated. The reward calculator increases the reward when the driving noise is smaller than a target value of driving noise.

1 Claim, 8 Drawing Sheets (56) References Cited

U.S. PATENT DOCUMENTS

| | | | |
|---|---|---|---|
| 10,103,611 B2* | 10/2018 | Murakami | H02K 1/278 |
| 10,338,541 B2* | 7/2019 | Tsuchida | G05B 13/0265 |
| 2004/0257030 A1 | 12/2004 | Taguchi et al. | |
| 2017/0033648 A1 | 2/2017 | Nishioka | |
| 2017/0060104 A1* | 3/2017 | Genma | G05B 13/0265 |
| 2017/0154283 A1* | 6/2017 | Kawai | H02P 23/12 |
| 2018/0026573 A1* | 1/2018 | Akashi | G06N 3/084 |
| | | | 318/6 |

FOREIGN PATENT DOCUMENTS

| | | |
|---|---|---|
| JP | 2004-343833 A | 12/2004 |
| JP | 2007-325406 A | 12/2007 |
| JP | 2010-279220 A | 12/2010 |
| JP | 2011-66974 A | 3/2011 |
| JP | 2012-5269 A | 1/2012 |
| JP | 6177842 B2 | 8/2017 |

OTHER PUBLICATIONS

Notification of Reason for Refusal received for Japanese Patent Application No. 2019-512849, dated Jun. 25, 2019, 8 pages including English Translation.

Notification of Reason for Refusal received for Japanese Patent Application No. 2019-512849, dated Nov. 26, 2019, 6 pages including English Translation.

Decision to Grant received for Japanese Patent Application No. 2019-512849, dated Mar. 24, 2020, 5 pages including English Translation.

* cited by examiner

| INPUT VALUE | AMPLITUDE OF ALTERNATING-CURRENT VOLTAGE Vh | FREQUENCY OF ALTERNATING-CURRENT VOLTAGE ωh |
|---|---|---|
| 1 | 15V | 500Hz |
| 2 | 20V | 500Hz |
| 3 | 25V | 500Hz |
| ⋮ | ⋮ | ⋮ |
| 8 | 50V | 1000Hz |
| 9 | 60V | 1000Hz |
| 10 | 70V | 1000Hz |

SYNCHRONOUS ROTATING MACHINE CONTROL DEVICE AND MACHINE LEARNING DEVICE

CROSS-REFERENCE TO RELATED APPLICATION

The present application is based on PCT filing PCT/JP2018/023704, filed Jun. 21, 2018, the entire contents of which are incorporated herein by reference.

FIELD

The present invention relates to a synchronous rotating machine control device which controls an operation of a synchronous rotating machine, and a machine learning device which determines a value of a parameter used for outputting a command value relating to a voltage used when the synchronous rotating machine operates.

BACKGROUND

When controlling a synchronous rotating machine, conventionally, a rotational speed and a magnetic pole position of a rotor are detected using a speed sensor and a position sensor, and the synchronous rotating machine is controlled on the basis of the detected values. However, since the above-described sensors are disadvantageous in terms of fault tolerance and maintenance, there has been proposed a method for detecting a rotational speed of a synchronous rotating machine and a magnetic pole position of a rotor without using sensors. A method for detecting a magnetic pole position of a rotor has been conventionally proposed in which with the use of a fact that application of an alternating-current voltage to a synchronous rotating machine results in generation of a current having an amplitude in a direction orthogonal to the alternating-current voltage, the magnetic pole position of a rotor where the amplitude of an alternating current becomes zero is estimated (for example, see Patent Literature 1).

CITATION LIST

Patent Literature

Patent Literature 1: Japanese Patent Application Laid-open No. H7-245981

SUMMARY

Technical Problem

In a conventional method for controlling a synchronous rotating machine, it is not easy to properly set the amplitude and the frequency of a high-frequency voltage applied to a synchronous rotating machine in order to estimate a magnetic pole position. That is, driving noise of a conventional synchronous rotating machine is relatively loud, and thus a user may feel uncomfortable. In addition, in such a conventional method for controlling a synchronous rotating machine, there occurs a problem that an error with respect to a preset position of a rotational position of a synchronous rotating machine becomes relatively large. There is a demand to provide a synchronous rotating machine control device which makes it possible for a user to determine the amplitude and the frequency of a high-frequency voltage applied to a synchronous rotating machine.

The present invention has been made in view of the above, and an object thereof is to obtain a synchronous rotating machine control device which allows a user to determine a value of the amplitude and a value of the frequency of a high-frequency voltage applied to a synchronous rotating machine.

Solution to Problem

In order to solve the above-mentioned problems and achieve the object, the present invention includes a control means that generates a first command value relating to a driving voltage for driving a synchronous rotating machine, and an adjustment means that acquires, from a storage means, a second command value relating to a high-frequency voltage having a frequency higher than a frequency of the driving voltage. The present invention further includes an addition means that superimposes the second command value on the first command value and outputs a third command value obtained thereby, and a voltage application means that applies an alternating-current voltage generated from the third command value to the synchronous rotating machine. The control means estimates a rotational position of the synchronous rotating machine on the basis of a high-frequency current flowing through the synchronous rotating machine by the high-frequency voltage. The storage means stores the second command value corresponding to each of values of a plurality of parameters. The adjustment means acquires, from the storage means, the second command value corresponding to a value of a parameter input by a user.

Advantageous Effects of Invention

The synchronous rotating machine control device according to the present invention achieves an effect that a user can easily determine a value of the amplitude and a value of the frequency of a high-frequency voltage applied to a synchronous rotating machine.

DESCRIPTION OF EMBODIMENTS

Hereinafter, a synchronous rotating machine control device and a machine learning device according to each embodiment of the present invention will be described in detail with reference to the drawings. The present invention is not limited to the embodiments.

First Embodiment

Figure 1:
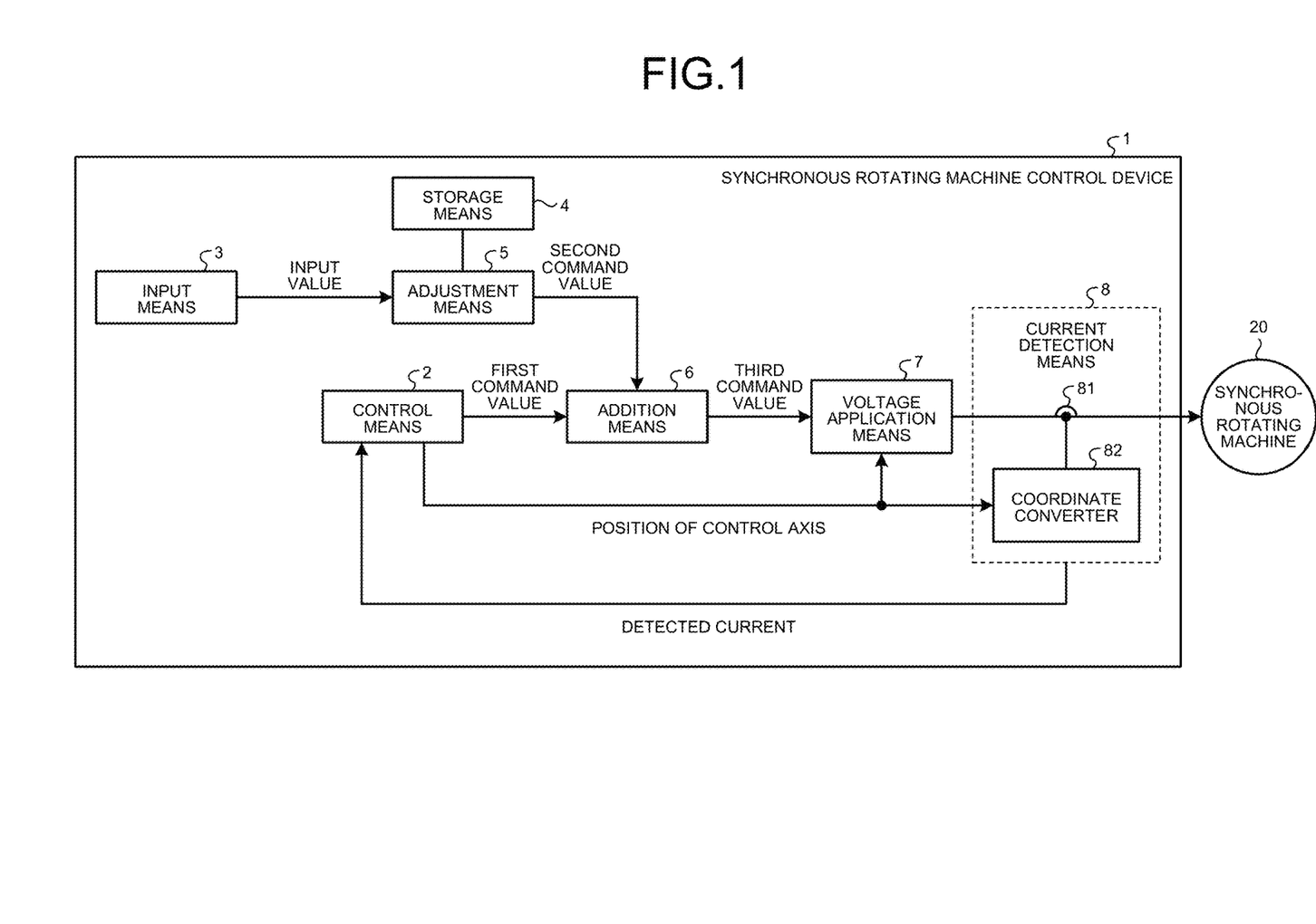
FIG. 1 is a diagram illustrating a configuration of a synchronous rotating machine control device according to a first embodiment.

FIG. 1 is a diagram illustrating a configuration of a synchronous rotating machine control device 1 according to a first embodiment. Hereinafter, the "synchronous rotating machine control device 1" may be referred to as a "control device 1". FIG. 1 also illustrates a synchronous rotating machine 20 controlled by the control device 1. The synchronous rotating machine 20 is a synchronous rotating machine using a permanent magnet. The synchronous rotating machine 20 may be a synchronous reluctance motor.

The control device 1 includes a control means 2 which generates a first command value relating to a driving voltage for driving the synchronous rotating machine 20. The first command value indicates a value of the amplitude of an alternating-current voltage for driving the synchronous rotating machine 20 and a value of the frequency of the alternating-current voltage. The control means 2 performs feedback control for controlling a rotational position of the synchronous rotating machine 20 to generate the first command value. A method for the control means 2 to generate the first command value is publicly known, so that a detailed description of the method will be omitted.

The control device 1 further includes an input means 3 used by a user when the user inputs, to the control device 1, a value of a parameter for determining a second command value relating to a high-frequency voltage having a frequency higher than the frequency of the driving voltage. The second command value indicates a value of the amplitude of an alternating-current voltage and a value of the frequency of the alternating-current voltage. The value of the parameter input by the user is different from the amplitude or the frequency itself of the high-frequency voltage as the second command value. The second command value is used to estimate a position of a rotor of the synchronous rotating machine 20 described later, and is superimposed on the first command value. The value of the frequency of the alternating-current voltage indicated by the second command value is sufficiently larger than the value of the frequency of the alternating-current voltage indicated by the first command value. That is, the value of the frequency of the alternating-current voltage indicated by the second command value indicates a frequency sufficiently higher than a frequency at which the synchronous rotating machine 20 rotates, and therefore does not contribute to a rotating operation of the synchronous rotating machine 20.

Figure 2:
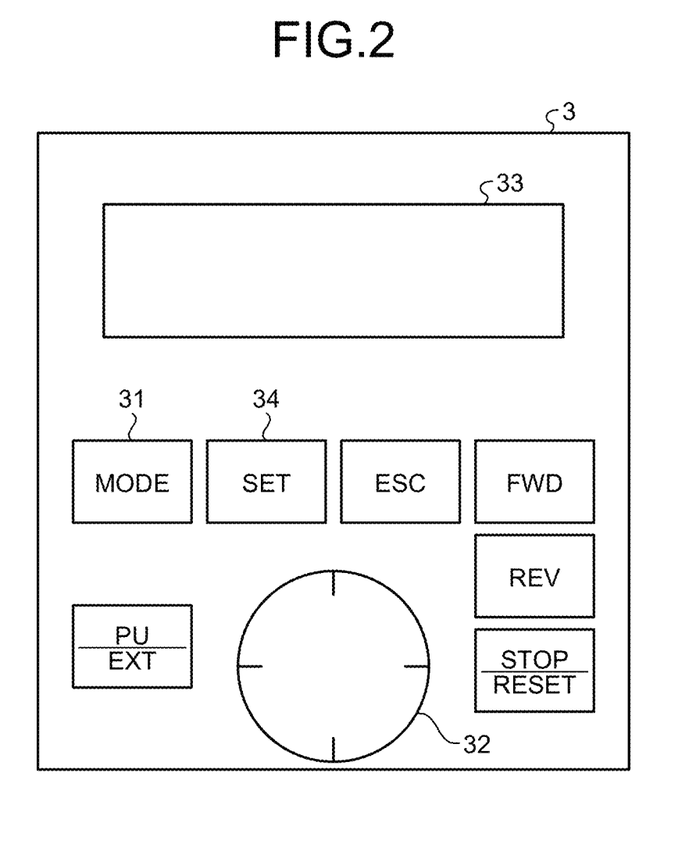
FIG. 2 is a view illustrating an example of an input means included in the synchronous rotating machine control device according to the first embodiment.

FIG. 2 is a view illustrating an example of the input means 3 included in the synchronous rotating machine control device 1 according to the first embodiment. The input means 3 includes a MODE button 31 which allows the user to set a state where a value is input, and a dial 32 used by the user to select a value. The input means 3 further includes a display unit 33 which displays a value selected by the user, and a SET button 34 used by the user when the user inputs the selected value to the control device 1.

When the user inputs the value of the parameter for determining the second command value to the control device 1, the user presses the MODE button 31 to set the input means 3 to a state where the value is input by the user. The user turns the dial 32 to select a value the user wishes to input to the control device 1. The display unit 33 displays the value selected by the user. The user confirms that the value selected by the user is displayed on the display unit 33, and presses the SET button 34. Consequently, the value of the parameter for determining the second command value is input to the control device 1.

Referring back to FIG. 1. The control device 1 further includes a storage means 4 which stores second command values corresponding to each of a plurality of input values. The storage means 4 stores second command values corresponding to each of the values of a plurality of parameters. For example, the storage means 4 stores a plurality of second command values in which at least one of the amplitude and the frequency of the high-frequency voltage is different from those in other second command values, each in association with one of the values of the plurality of parameters. For example, the storage means 4 stores the second command values such that the amplitude of the high-frequency voltage increases as the value of the parameter increases. For example, the storage means 4 stores the second command values such that the frequency of the high-frequency voltage increases as the value of the parameter increases.

Figure 3:
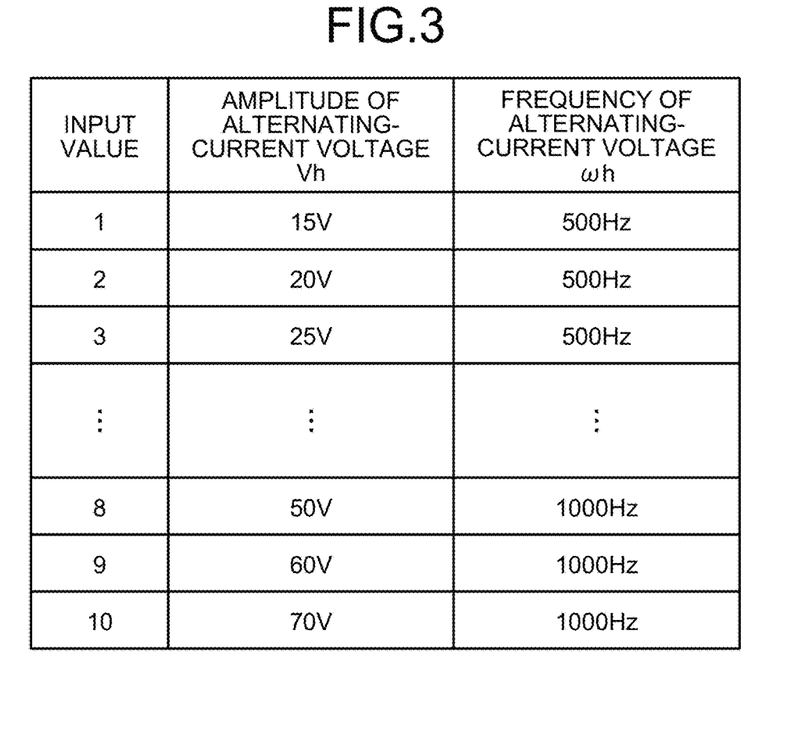
FIG. 3 is a figure illustrating an example of information stored in a storage means included the synchronous rotating machine control device according to the first embodiment.

Each of the plurality of input values is a value that may be input to the control device 1 by the user. An example of the storage means 4 is a semiconductor memory. FIG. 3 is a figure illustrating an example of information stored in the storage means 4 included in the synchronous rotating machine control device 1 according to the first embodiment. The storage means 4 stores, for each of the plurality of input values, the second command value which is a combination of a value of the amplitude of the alternating-current voltage and a value of the frequency of the alternating-current voltage. That is, each of the plurality of input values is associated with one of the plurality of second command values.

Referring back to FIG. 1. The control device 1 further includes an adjustment means 5 which acquires, from the storage means 4, the second command value relating to the high-frequency voltage having a frequency higher than the frequency of the driving voltage. The adjustment means 5 acquires, from the storage means 4, the second command value corresponding to the value of the parameter input by the user. Specifically, the adjustment means 5 acquires, from the storage means 4, the second command value corresponding to the value input by the user using the input means 3, and outputs the acquired second command value. In FIG. 1, "the value input by the user using the input means 3" is described as "INPUT VALUE".

For example, as illustrated in FIG. 3, an input value "3" is associated with the second command value including a combination of 25 V and 500 Hz. That is, the input value "3"

corresponds to a command value relating to a high-frequency voltage whose frequency is 500 Hz and whose amplitude is 25 V. Therefore, when the user inputs the value "3" to the control device 1 using the input means 3, the adjustment means 5 acquires the second command value including the combination of 25 V and 500 Hz from the storage means 4, and outputs the acquired second command value.

The control device 1 further includes an addition means 6 which superimposes the second command value for estimating the position of the synchronous rotating machine 20 output from the adjustment means 5 on the first command value for driving the synchronous rotating machine 20 generated by the control means 2, and outputs a third command value obtained by the superimposition. The control device 1 further includes a voltage application means 7 which applies, to the synchronous rotating machine 20, an alternating-current voltage generated on the basis of the third command value obtained by the addition means 6. The voltage application means 7 supplies three-phase currents to the synchronous rotating machine 20. An example of the voltage application means 7 is a voltage converter. An example of the voltage converter is an inverter.

The control device 1 further includes a current detection means 8 which detects a value of an alternating current flowing through the synchronous rotating machine 20 by the alternating-current voltage applied to the synchronous rotating machine 20. The current detection means 8 includes a detection unit 81 which detects a value of a current supplied to the synchronous rotating machine 20, and a coordinate converter 82 which converts the value detected by the detection unit 81 into a d-axis current and a q-axis current. The coordinate converter 82 transmits a value of a current detected for each of the d-axis and the q-axis to the control means 2 on the basis of the current value detected by the detection unit 81 and a rotational position estimated by the control means 2. Since the three-phase currents are supplied to the synchronous rotating machine 20, the detection unit 81 detects a value of each of the three-phase currents supplied to the synchronous rotating machine 20.

The detection unit 81 may directly detect the value of each of the three-phase currents, or may detect the value of each of the three-phase currents by directly detecting values of two-phase currents out of the three-phase currents and using a property that the sum of the values of the three-phase currents at each time point is zero. In a case where the voltage application means 7 is an inverter, the detection unit 81 may calculate the value of each of the three-phase currents on the basis of a bus current value of the inverter, a value of a current flowing through a switching element which is a component of the inverter, and a state of the switching element.

The control means 2 estimates a position of a control axis of the synchronous rotating machine 20, that is, a rotational position of the synchronous rotating machine 20, on the basis of detected current values converted into the two axes of the d axis and the q axis from the coordinate converter 82. That is, the control means 2 estimates the rotational position of the synchronous rotating machine 20 on the basis of a high-frequency current flowing through the synchronous rotating machine 20 by the high-frequency voltage. Furthermore, the control means 2 estimates the rotational position of the synchronous rotating machine 20 on the basis of the high-frequency current out of alternating currents detected by the current detection means 8. A method for estimating the rotational position of the synchronous rotating machine 20 will be described later. The control means 2 outputs information indicating the position of the control axis of the synchronous rotating machine 20 to the coordinate converter 82 and the voltage application means 7. Furthermore, the control means 2 generates the first command value by performing feedback control on the basis of the rotational position estimated by using the values output from the current detection means 8.

Figure 4:
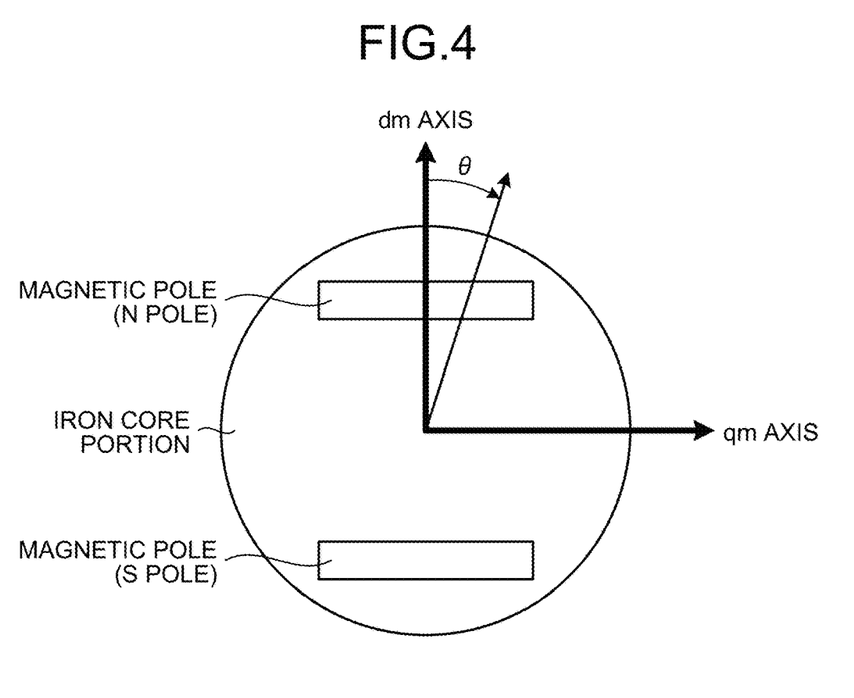
FIG. 4 is a diagram illustrating a structure of a rotor of a synchronous rotating machine according to the first embodiment.

FIG. 4 is a diagram illustrating a structure of the rotor of the synchronous rotating machine according to the first embodiment. For the sake of simple explanation of the structure of the synchronous rotating machine, FIG. 4 illustrates a structure of the rotating machine with two poles, i.e., a set of one N pole and one S pole. In FIG. 4, an axis extending from the center to the N pole is defined as a dm axis, and an axis orthogonal to the dm axis is defined as a qm axis. Consideration is given to changes in an inductance in one revolution of the rotor using the dm axis as reference. A value of the inductance differs between a magnet portion which is magnetically saturated by a magnetic flux of a magnet and has a small inductance, and an iron core portion which is not magnetized.

Figure 5:
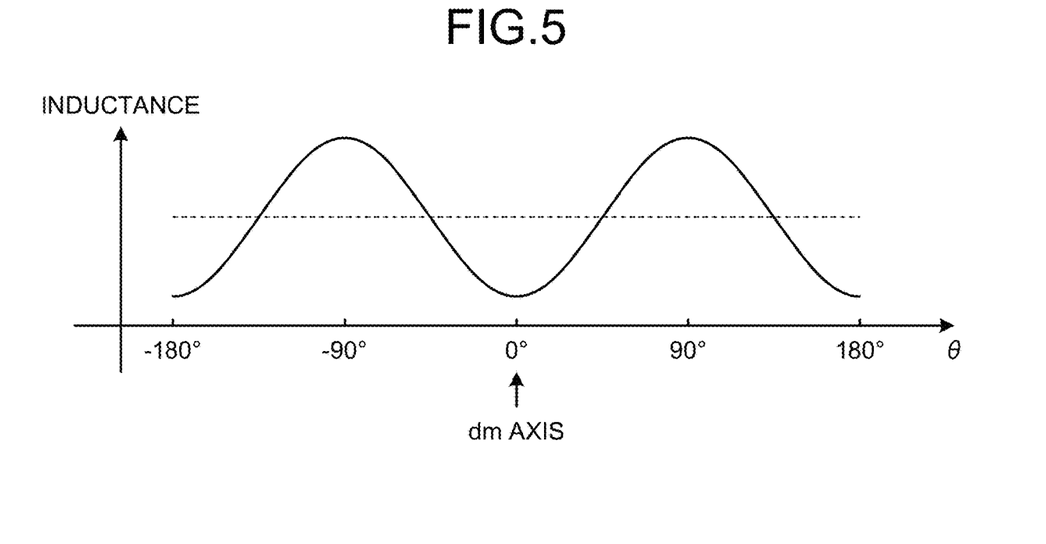
FIG. 5 is a diagram for explaining an inductance of the synchronous rotating machine according to the first embodiment.

That is, as illustrated in FIG. 5, fluctuations in the inductance occur in one revolution of the rotor. FIG. 5 is a diagram for explaining the inductance of the synchronous rotating machine according to the first embodiment. A ratio between a maximum value and a minimum value of the fluctuations is called a saliency ratio. In a magnetic pole position estimation method using an alternating-current voltage applied to a synchronous rotating machine, the electrical saliency of the rotor of the synchronous rotating machine as illustrated in FIG. 5 is used. In addition, the magnetic pole position estimation method uses a fact that a current generated when a voltage having a frequency higher than a drive frequency of the synchronous rotating machine 20 is applied to the synchronous rotating machine 20 varies depending on the inductance of the rotor.

Figure 6:
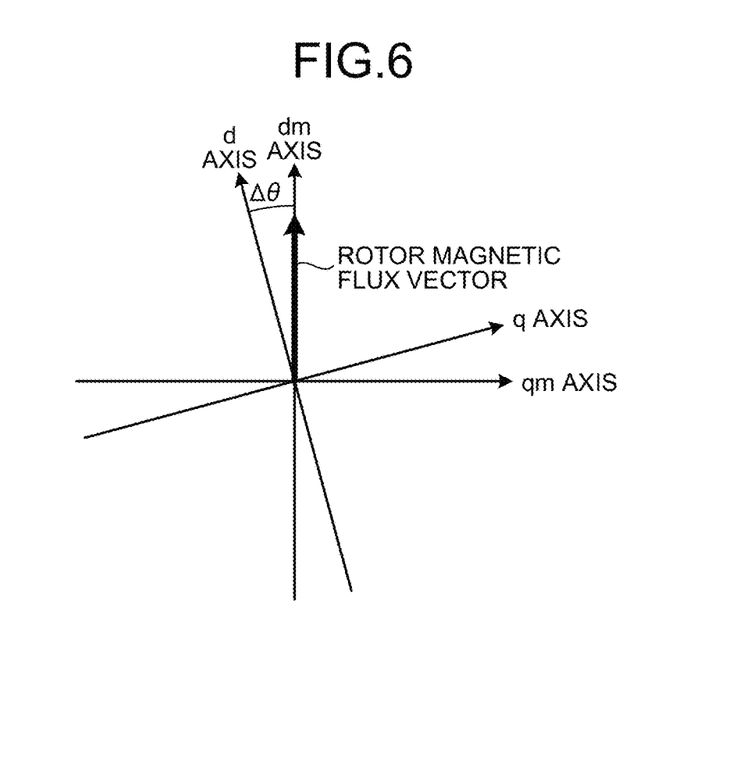
FIG. 6 is a diagram illustrating a position and a phase of the rotor of the synchronous rotating machine according to the first embodiment.

FIG. 6 is a diagram illustrating a position and a phase of the rotor of the synchronous rotating machine according to the first embodiment. It is assumed that a direction of a magnetic flux vector of the rotor is the dm axis, a direction orthogonal to the dm axis is the qm axis, a direction $\theta_0$ in which the alternating-current voltage is applied is the d axis, and a direction orthogonal to the d axis is the q axis. It is assumed that a deviation between the d axis and the dm axis is $\Delta\theta$. The d axis normally operates so as to coincide with the dm axis, but FIG. 6 is a diagram illustrating a case where a deviation of $\Delta\theta$ has occurred instantaneously.

When an alternating-current voltage vector $v_{dh}$ is applied to the d axis and an alternating-current voltage vector $v_{qh}$ is applied to the q axis, the following formula (1) is established. In formula (1), p represents a differential operator.

[Formula 1]

$$\begin{bmatrix} v_{dh} \\ v_{qh} \end{bmatrix} = \begin{bmatrix} R + pL_{dc} - \omega_r L_{dqc} & pL_{dqc} - \omega_r L_{qc} \\ pL_{dqc} + \omega_r L_{dc} & R + p L_{qc} + \omega_r L_{dqc} \end{bmatrix} \begin{bmatrix} i_{dh} \\ i_{qh} \end{bmatrix} + \omega_r \phi_f \begin{bmatrix} -\sin\Delta\theta \\ \cos\Delta\theta \end{bmatrix} \quad (1)$$

Provided that
$$\begin{cases} L_{dc} = L - 1\cos2\Delta\theta,\ L_{qc} = L + 1\cos2\Delta\theta \\ L_{dqc} = 1\sin2\Delta\theta \\ L = \dfrac{L_d + L_q}{2},\ 1 = \dfrac{L_q - L_d}{2} \\ R: \text{Stator winding resistance of synchronous rotating machine} \\ L_d: \text{Inductance in } dm\text{-axis direction} \\ L_q: \text{Inductance in } qm\text{-axis direction} \\ \Delta\theta: \text{(Position of dm axis)-(position of } d \text{ axis)} \\ \omega_r: \text{Rotational speed},\ \phi_f: \text{Magnitude of rotor magnetic flux vector} \\ i_{dh}: d\text{-axis alternating current},\ i_{qh}: q\text{-axis alternating current} \end{cases}$$

Here, if it is assumed that the rotational speed $\omega_r \approx 0$ holds, the following formula (2) is obtained from formula (1).

[Formula 2]

$$\begin{bmatrix} v_{dh} \\ v_{qh} \end{bmatrix} = R \begin{bmatrix} i_{dh} \\ i_{qh} \end{bmatrix} + p \begin{bmatrix} L_{dc} & L_{dqc} \\ L_{dqc} & L_{qc} \end{bmatrix} \begin{bmatrix} i_{dh} \\ i_{qh} \end{bmatrix} \quad (2)$$

The second term on the right side of formula (2) represents differential of each alternating current. Because the differential of each alternating current is multiplied by a frequency $\omega h$ of the alternating-current voltage, a value of the second term on the right side is very large compared to a value of the first term on the right side, so that the first term on the right side can be ignored. As a result, the following formula (3) can be obtained.

[Formula 3]

$$p\begin{bmatrix} i_{dh} \\ i_{qh} \end{bmatrix} = \frac{1}{L^2 - 1^2} \begin{bmatrix} L + 1\cos2\Delta\theta & -1\sin2\Delta\theta \\ -1\sin2\Delta\theta & L - 1\cos2\Delta\theta L \end{bmatrix} \begin{bmatrix} v_{dh} \\ v_{qh} \end{bmatrix} \quad (3)$$

Here, if it is assumed that alternating-current voltage vectors are as expressed by the following formula (4), by assigning formula (4) to formula (3) and integrating both sides, the following formula (5) is obtained for an alternating-current vector $i_{dh}$ and an alternating-current vector $i_{dh}$.

[Formula 4]

$$v_{dh} = Vh\sin\omega ht \quad (4)$$
$$v_{qh} = 0$$

[Formula 5]

$$\begin{bmatrix} i_{dh} \\ i_{qh} \end{bmatrix} = \frac{-Vh}{\omega h(L^2 - 1^2)} \begin{bmatrix} L + 1\cos2\Delta\theta & -1\sin2\Delta\theta \\ -1\sin2\Delta\theta & L - 1\cos2\Delta\theta \end{bmatrix} \begin{bmatrix} \cos\omega ht \\ 0 \end{bmatrix} \quad (5)$$
$$= \frac{-Vh}{\omega h(L^2 - 1^2)} \begin{bmatrix} L + 1\cos2\Delta\theta \\ -1\sin2\Delta\theta \end{bmatrix} \cos\omega ht$$

In order to estimate a magnetic pole position, $\theta_0$ which makes the deviation $\Delta\theta$ zero is calculated. Here, if an amplitude component of the alternating current of formula (5) is used, $\Delta\theta$ can be expressed as a function of a current amplitude. Here, an amplitude $|i_{qh}|$ of an orthogonal component $i_{qh}$ of the alternating current is used. As a result, the following formula (6) is obtained from formula (5).

[Formula 6]

$$|i_{qh}| = \frac{Vh1}{\omega h(L^2 - 1^2)} \sin2\Delta\theta \quad (6)$$

By converting formula (6) into a formula of $\Delta\theta$, the following formula (7) is obtained.

[Formula 7]

$$\Delta\theta = \frac{\sin^{-1}\left\{\dfrac{|i_{qh}|\omega h(L^2 - 1^2)}{Vh1}\right\}}{2} \quad (7)$$

From formula (7), making $\Delta\theta$ close to zero is equivalent to making $|i_{qh}|$ close to zero. Accordingly, an estimated position $\theta_0$ can be expressed by the following formula (8).

[Formula 8]

$$\theta_0 = \theta_0 + K_{p\theta}\left(1 + \frac{K_{i\theta}}{s}\right)(0 - |i_{qh}|) \quad (8)$$

The frequency $\omega h$ of the alternating-current voltage and an amplitude Vh of the alternating-current voltage are included in the second command value output from the adjustment means 5. L and l can be obtained from formula (1) using Ld and Lq, and Ld and Lq can be known by measuring Ld and Lq in advance. Therefore, the deviation $\Delta\theta$ can be calculated on the basis of $|i_{qh}|$.

Here, formula (6) and the final estimated position $\theta_0$ are determined by the amplitude $|i_{qh}|$ of the alternating current, and $|i_{qh}|$ changes depending on the amplitude Vh of the alternating-current voltage and the frequency $\omega h$ of the alternating-current voltage. That is, the estimated position $\theta_0$ changes depending on the second command value, but the alternating current which is related to the second command value is a current which is not related to driving and causes vibration. That is, as a voltage value of the second command value increases, the accuracy of estimation of the rotational position increases, but vibration or noise increases. Furthermore, as a frequency of the second command value increases, the accuracy of estimation of the rotational position increases, but vibration or noise increases. Therefore, it is not desirable to increase the alternating current too much from the viewpoint of vibration or noise.

The vibration due to the alternating current is caused by a torque generated by the alternating current. Therefore, a noise level is affected by moment of inertia of the synchronous rotating machine and moment of inertia of a machine connected to the synchronous rotating machine. Accordingly, by changing a current level by these factors, an appropriate value for each of the amplitude and the frequency of the high-frequency alternating-current voltage as the second command value is determined.

In order to determine an appropriate value for each of the amplitude and the frequency of the alternating-current voltage, the user uses the input means 3 to input, to the control device 1, the value of the parameter for determining the second command value relating to the high-frequency voltage for estimating the rotational position of the synchronous rotating machine 20. The second command value is a combination of a value of the amplitude of a voltage and a value of the frequency of the voltage. As illustrated in FIG. 3, in the first embodiment, any one of values 1 to 10 is input to the control device 1 by the user. Although 1 to 10 are exemplified as input values in the present embodiment, it goes without saying that the types of input values are not limited to numerals and the number of input values is not limited to 10.

Figure 7:
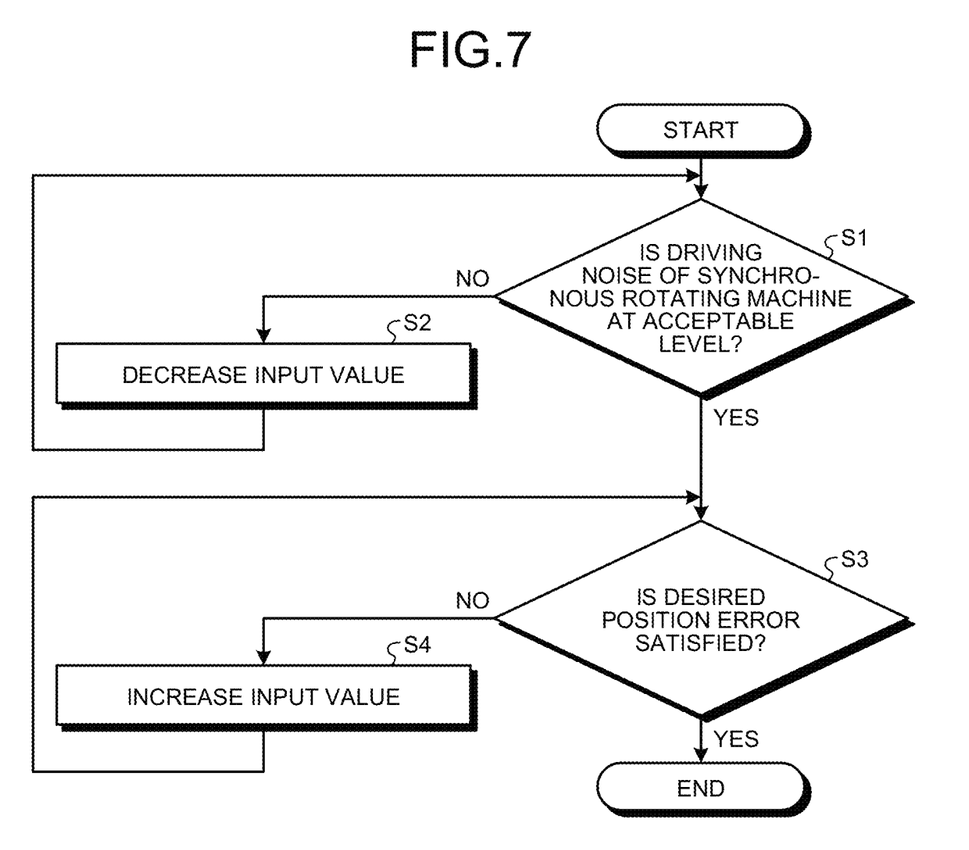
FIG. 7 is a flowchart illustrating an example of a procedure of an operation in which a user determines a value to be input to the control device according to the first embodiment.

FIG. 7 is a flowchart illustrating an example of a procedure of an operation in which the user determines the value to be input to the control device 1 according to the first embodiment. In the present embodiment, for example, the user performs the operation illustrated in FIG. 7 in a parameter adjustment mode for optimizing the second command value which is different from an actual drive mode for actually driving the synchronous rotating machine using the determined second command value. The user determines whether driving noise of the synchronous rotating machine 20 is at an acceptable level (S1). If the user determines that the driving noise of the synchronous rotating machine 20 is not at the acceptable level (No in S1), the user inputs, to the control device 1 using the input means 3, a value smaller than a value previously input to the control device 1 (S2). That is, the user decreases the input value in step S2. The user performs the operation of step S1 after performing the operation of step S2.

If the user determines that the driving noise of the synchronous rotating machine 20 is at the acceptable level (Yes in S1), the user determines whether an error with respect to a predetermined position of the rotational position of the synchronous rotating machine 20 satisfies a desired position error (S3). If the user determines that the error with respect to the predetermined position of the rotational position of the synchronous rotating machine 20 does not satisfy the desired position error (No in S3), the user inputs, to the control device 1 using the input means 3, a value larger than the value previously input to the control device 1 (S4). That is, the user increases the input value in step S4. The user performs the operation of step S3 after performing the operation of step S4.

Here, the predetermined position of the rotational position indicates a rotational position of the synchronous rotating machine 20 determined by the first command value. Alternatively, the predetermined position of the rotational position may be a position of the synchronous rotating machine 20 obtained from a position detector attached in the parameter adjustment mode. Obtaining an optimum second command value by the parameter adjustment mode makes it possible to drive the synchronous rotating machine in a sensorless state with no position detector in the actual drive mode. The adjustment means 5 uses, in the actual drive mode, the second command value corresponding to the value of the parameter determined by the parameter adjustment mode.

If the user determines that the error with respect to the predetermined position of the rotational position of the synchronous rotating machine 20 satisfies the desired position error (Yes in S3), the user ends the operation of inputting a value to the control device 1.

As described above, the synchronous rotating machine control device 1 according to the first embodiment includes the input means 3 used by the user when the user inputs, to the control device 1, the value of the parameter for determining the second command value relating to the high-frequency voltage having a frequency higher than the frequency of the driving voltage for driving the synchronous rotating machine 20. The control device 1 further includes the adjustment means 5 which acquires, from the storage means 4, the second command value corresponding to the value input by the user using the input means 3. The control device 1 further includes the voltage application means 7 which applies a voltage to the synchronous rotating machine 20 on the basis of the third command value including the second command value acquired by the adjustment means 5. The second command value is a value superimposed on the first command value, and is a value indicating a value of the amplitude and a value of the frequency of the high-frequency alternating-current voltage. It is enough for the user to change only an input value corresponding to the predetermined second command value and to select an input value with which desired position accuracy and vibration or noise can be obtained. The synchronous rotating machine control device 1 according to the first embodiment can allow the user to easily determine a value of each of the amplitude and the frequency of the high-frequency alternating-current voltage for estimating the position of the synchronous rotating machine 20.

The adjustment means 5 may be set such that at least one of the amplitude and the frequency of the high-frequency voltage as the second command value is changed when the input value is changed. That is, the storage means 4 may store the plurality of second command values in which at least one of the amplitude and the frequency of the high-frequency voltage is different from those in other second command values, each in association with one of the values of the parameters which are the input values.

The input means 3 is not limited to that described with reference to FIG. 2. The input means 3 may be constituted with a plurality of buttons or may include a keyboard. It is satisfactory as long as the input means 3 is used by the user when the user inputs the value of the parameter for determining the second command value relating to the high-frequency voltage for estimating the rotational position of the synchronous rotating machine 20.

The adjustment means 5 may calculate the value of the amplitude of the alternating-current voltage included in the second command value using the following formula (9). In formula (9), "$k_{vh}$" represents a predetermined constant, and "hf_adj" represents a value input by the user using the input means 3.

[Formula 9]

$$Vh = k_{vh} \times hf\_adj \qquad (9)$$

The adjustment means 5 may calculate the value of the frequency of the alternating-current voltage included in the second command value using the following formula (10). In formula (10), "$k_{\omega h}$" represents a predetermined constant, and "hf_adj" represents a value input by the user using the input means 3.

[Formula 10]

$$\omega h = k_{\omega h} / hf\_adj \qquad (10)$$

Figure 8:
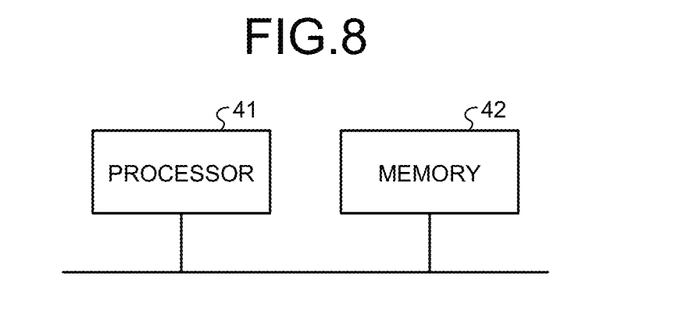
FIG. 8 is a diagram illustrating a processor in a case where at least a part of functions of a control means, an adjustment means, and an addition means included in the synchronous rotating machine control device according to the first embodiment is realized by the processor.

FIG. 8 is a diagram illustrating a processor 41 in a case where at least a part of functions of the control means 2, the adjustment means 5, and the addition means 6 included in the synchronous rotating machine control device 1 according to the first embodiment is realized by the processor 41. That is, at least a part of the functions of the control means 2, the adjustment means 5, and the addition means 6 included in the control device 1 may be realized by the processor 41 executing programs stored in a memory 42.

The processor 41 is a central processing unit (CPU), a processing device, an arithmetic device, a microprocessor, a microcomputer, or a digital signal processor (DSP). FIG. 8 also illustrates the memory 42.

In the case where at least a part of the functions of the control means 2, the adjustment means 5, and the addition means 6 is realized by the processor 41, the part of the functions is realized by a combination of the processor 41 and software, firmware, or software and firmware. The software or the firmware is described as a program and stored in the memory 42.

By reading and executing the programs stored in the memory 42, the processor 41 realizes at least a part of the functions of the control means 2, the adjustment means 5, and the addition means 6. In the case where at least a part of the functions of the control means 2, the adjustment means 5, and the addition means 6 is realized by the processor 41, the control device 1 includes the memory 42 for storing programs with which steps executed by at least a part of the control means 2, the adjustment means 5, and the addition means 6 are executed as a result.

It can be said that the programs stored in the memory 42 cause a computer to execute a procedure or method executed by at least a part of the control means 2, the adjustment means 5, and the addition means 6.

The memory 42 is, for example, a non-volatile or volatile semiconductor memory such as a random access memory (RAM), a read only memory (ROM), a flash memory, an erasable programmable read only memory (EPROM), or an electrically erasable programmable read only memory (EEPROM(registered trademark)); a magnetic disk; a flexible disk; an optical disk; a compact disc; a mini disk; a digital versatile disk (DVD); or the like.

Figure 9:
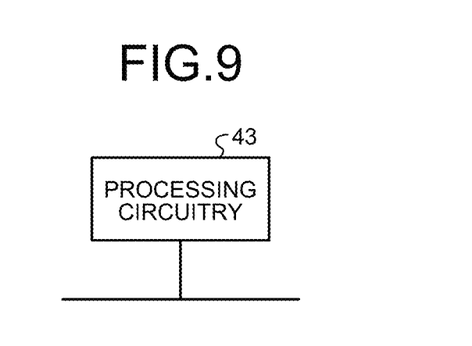
FIG. 9 is a diagram illustrating processing circuitry in a case where at least a part of components constituting the control means, the adjustment means, and the addition means included in the synchronous rotating machine control device according to the first embodiment is realized by the processing circuitry.

FIG. 9 is a diagram illustrating processing circuitry 43 in a case where at least a part of components constituting the control means 2, the adjustment means 5, and the addition means 6 included in the synchronous rotating machine control device 1 according to the first embodiment is realized by the processing circuitry 43. That is, at least a part of the functions of the control means 2, the adjustment means 5, and the addition means 6 may be realized by the processing circuitry 43.

The processing circuitry 43 is dedicated hardware. The processing circuitry 43 is, for example, a single circuit, a composite circuit, a programmed processor, a parallel programmed processor, an application specific integrated circuit (ASIC), a field-programmable gate array (FPGA), or a combination thereof. A part of the control means 2, the adjustment means 5, and the addition means 6 may be dedicated hardware separate from the rest.

Regarding a plurality of functions of the control means 2, the adjustment means 5, and the addition means 6, a part of the plurality of functions may be realized by software or firmware, and the rest of the plurality of functions may be realized by dedicated hardware. Thus, the plurality of functions of the control means 2, the adjustment means 5, and the addition means 6 can be realized by hardware, software, firmware, or a combination thereof.

According to the present embodiment, in order to adjust a position estimation error and a noise characteristic depending on moment of inertia of the synchronous rotating machine or a mechanical device used by the user, the user can easily adjust the second command value which is a high-frequency voltage command superimposed on the first command value for driving the synchronous rotating machine by selecting a parameter input value corresponding to a predetermined second command value pattern. That is, according to the present embodiment, an effect is achieved that the user can easily determine the second command value with or without know-how technology related to the adjustment of the high-frequency voltage.

In the present embodiment, regarding the amplitude and the frequency of the alternating-current voltage stored in the storage means 4 and corresponding to the value of the parameter which is the input value of the user, a table illustrated in FIG. 3 is set so that as the value of the parameter increases, the amplitude increases and the frequency increases. That is, the table is made so that as the value of the parameter increases, the noise of the synchronous rotating machine increases, while the position estimation error decreases. Therefore, by sequentially increasing the value of the parameter, the user can easily find a condition under which a desired noise characteristic is obtained. Needless to say, the value of the parameter may be decreased sequentially.

In the present embodiment, the second command value is determined on the basis of the value of the parameter input by the user in the parameter adjustment mode, and the determined second command value can be used in the actual drive mode.

In addition, needless to say, the second command value may be further optimized depending on the synchronous rotating machine or the mechanical device by further performing fine adjustment of parameters conventionally performed, on the second command value determined on the basis of the value of the parameter input by the user in the present embodiment. Also in such a case, it is enough for the user to perform, on the second command value corresponding to the value of the parameter selected by using the present embodiment as a first step for selecting an optimum second command value, the fine adjustment only as a second step, and therefore, the user can easily determine the second command value.

Second Embodiment

Figure 10:
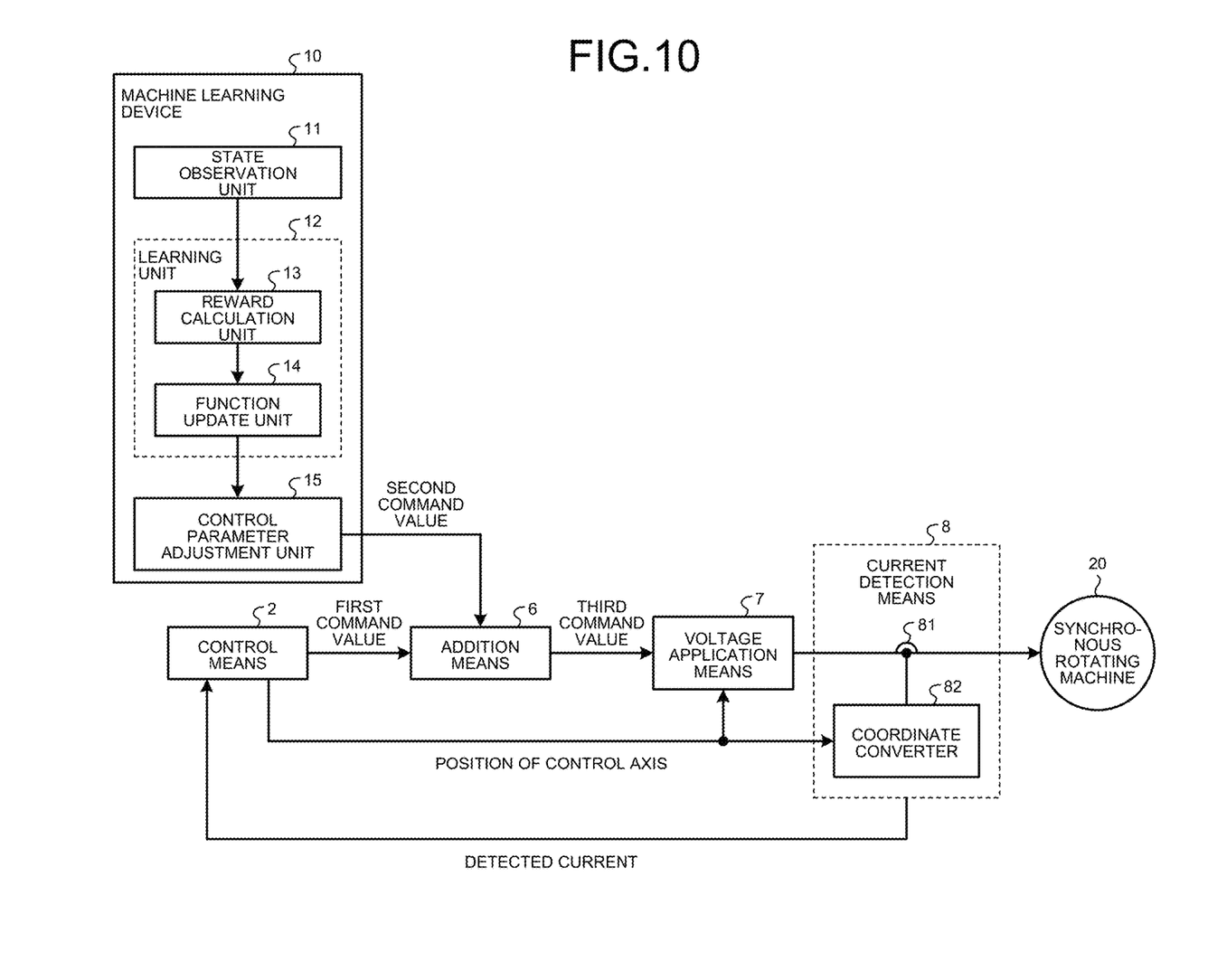
FIG. 10 is a diagram illustrating a configuration of a machine learning device according to a second embodiment.

FIG. 10 is a diagram illustrating a configuration of a machine learning device 10 according to a second embodiment. FIG. 10 also illustrates the control means 2, the addition means 6, the voltage application means 7, the current detection means 8, and the synchronous rotating machine 20 described in the first embodiment. In the first embodiment, the adjustment means 5 outputs the second command value. On the other hand, in the second embodiment, the machine learning device 10 outputs the second command value. That is a difference between the second embodiment and the first embodiment. In the second embodiment, the difference will be mainly described.

The machine learning device 10 is a device which determines a value of a parameter used for outputting the second command value relating to the high-frequency voltage for estimating the position of the synchronous rotating machine 20, the high-frequency voltage having a frequency higher than the frequency of the driving voltage used when the synchronous rotating machine 20 is driven. The machine learning device 10 includes a state observation unit 11 which observes, as a state variable, at least one of driving noise of the synchronous rotating machine 20 and an error with respect to a preset position of a rotational position of the synchronous rotating machine 20 determined by the driving voltage.

The driving noise of the synchronous rotating machine 20 is detected and quantified by a device which detects the driving noise. An example of the device is a microphone. In a case where a vibration sensor is attached to the synchronous rotating machine 20, the driving noise of the synchronous rotating machine 20 may be quantified on the basis of a frequency detected by the vibration sensor. The driving noise of the synchronous rotating machine 20 may be quantified on the basis of a value detected by the current detection means 8 on the assumption that a torque of the synchronous rotating machine 20 is related to the driving noise of the synchronous rotating machine 20. In a case where it is required to minimize noise relating to a specific frequency, the state observation unit 11 may quantify only the driving noise of the synchronous rotating machine 20 relating to the specific frequency.

The preset position of the rotational position of the synchronous rotating machine 20 may be a rotational position of the synchronous rotating machine 20 determined from the first command value, or a rotational position of the synchronous rotating machine 20 detected by a detector. An estimated rotational position is a rotational position estimated by the control means 2.

The machine learning device 10 further includes a learning unit 12 which determines the value of the parameter used for outputting the second command value relating to the high-frequency voltage for estimating the rotational position of the synchronous rotating machine 20, on the basis of the state variable observed by the state observation unit 11. The learning unit 12 determines the value of the parameter on the basis of a learning algorithm. The learning algorithm used by the learning unit 12 may be any learning algorithm.

As an example, a case where the learning unit 12 performs reinforcement learning will be described below. Reinforcement learning is learning in which an agent in an environment observes the current state and decides what action to take. The agent gets a reward from the environment by selecting an action, and learns a policy with which a maximum reward is obtained through a series of actions.

A typical example of reinforcement learning is Q learning or TD learning. In Q learning, a general update formula for an action value function Q(s, a) is the following formula (11).

[Formula 11]

$$Q(s_t, a_t) \leftarrow Q(s_t, a_t) + \alpha\left(r_{t+1} + \gamma\max_a Q(s_{t+1}, a) - Q(s_t, a_t)\right) \quad (11)$$

In formula (11), $s_t$ represents an environment at time t, and $a_t$ represents an action at time t. The environment is changed to $s_{t+1}$ by action $a_t$. $r_{t+1}$ represents a reward acquired by the change in the environment, $\gamma$ represents a discount factor, and $\alpha$ represents a learning coefficient. In a case where Q learning is applied, action $a_t$ is to adjust at least one of the amplitude of an alternating-current voltage and the frequency of the alternating-current voltage included in the second command value.

The update formula expressed by formula (11) increases an action value Q if an action evaluation of best action a at time t+1 is larger than the action value Q of action a executed at time t. The update formula decreases the action value Q if the action evaluation of best action a at time t+1 is smaller than or equal to the action value Q of action a executed at time t. In other words, the action value function Q(s, a) is updated so that the action value Q of action a at time t approaches a best action value at time t+1. Consequently, a best action value in a certain environment will be sequentially propagated to action values in the previous environments.

The learning unit 12 includes a reward calculation unit 13 which calculates a reward on the basis of a state variable observed by the state observation unit 11, and a function update unit 14 for determining a value of a parameter on the basis of the calculated reward.

In a case where the driving noise of the synchronous rotating machine 20 is a state variable, when the driving noise observed by a driving noise detector is smaller than a preset target value of driving noise, the reward calculation unit 13 increases reward r. For example, when the observed driving noise is smaller than the target value of driving noise, the reward calculation unit 13 adds a reward of "1" to reward r. On the other hand, when the observed driving noise is larger than the preset target value of driving noise, the reward calculation unit 13 adds a reward of "−1" to reward r.

In a case where the error with respect to the preset position of the rotational position of the synchronous rotating machine 20 is a state variable, when the error is smaller than a preset target value of error, the reward calculation unit 13 increases reward r. For example, when the error is smaller than the target value of error, the reward calculation unit 13 gives a reward of "1" to reward r. On the other hand, when the error is larger than the preset target value of error, the reward calculation unit 13 gives a reward of, for example, "−1" to reward r.

The function update unit 14 updates a function for adjusting the amplitude of the alternating-current voltage and the frequency of the alternating-current voltage included in the second command value, depending on the reward calculated by the reward calculation unit 13. For example, in Q learning, an action value function $Q(s_t, a_t)$ expressed by formula (11) is a function for adjusting the amplitude of the alternating-current voltage and the frequency of the alternating-current voltage included in the second command value.

The machine learning device 10 further includes a control parameter adjustment unit 15 which outputs a second command value corresponding to the value determined by the learning unit 12. The function of the control parameter adjustment unit 15 is the same as the function of the adjustment means 5 of the first embodiment. FIG. 10 does not illustrate the storage means 4 described in the first embodiment. In a case where the control parameter adjustment unit 15 needs information stored in the storage means 4, similarly to the adjustment means 5, the control parameter adjustment unit 15 uses the information stored in the storage means 4 to output the second command value.

Figure 11:
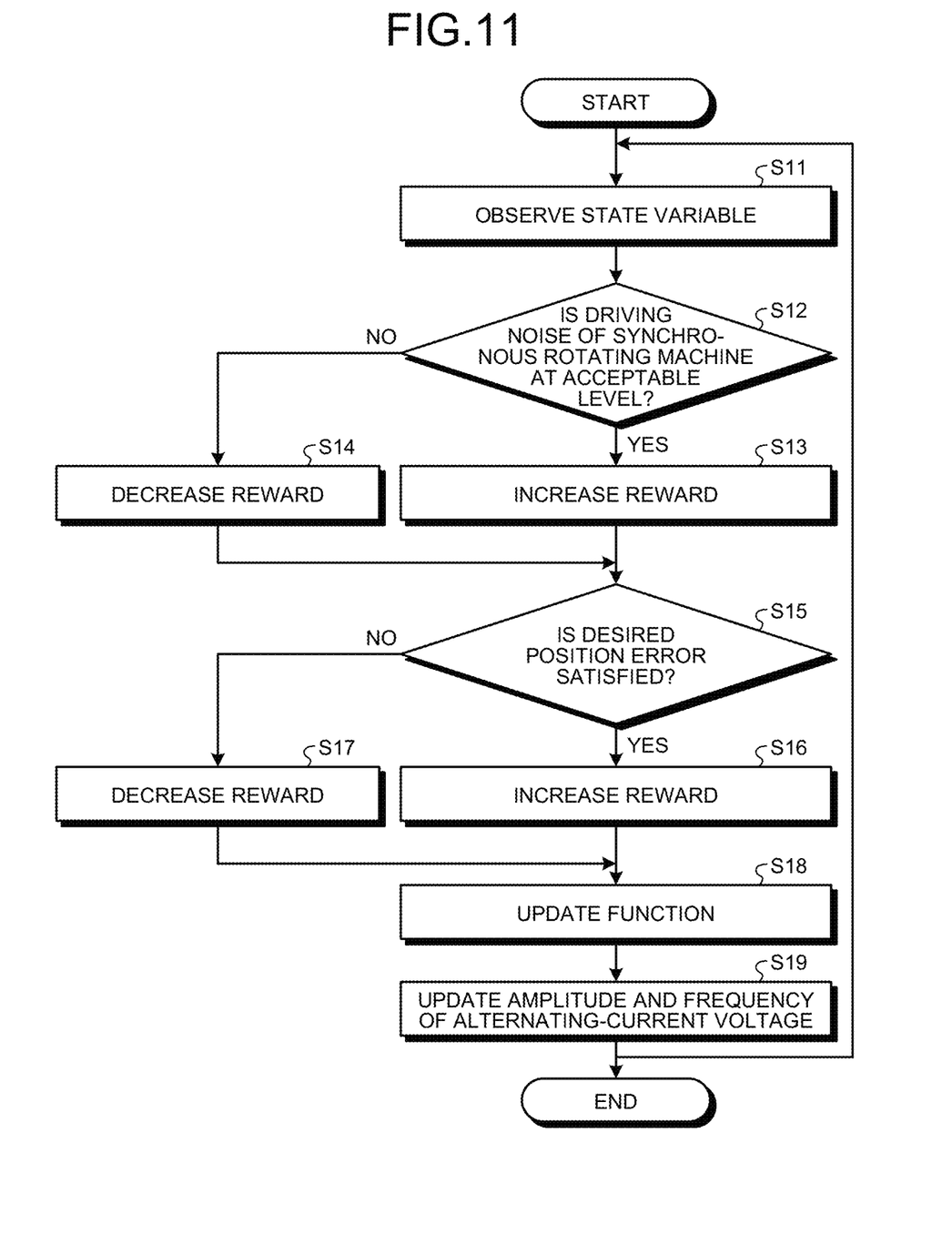
FIG. 11 is a flowchart illustrating an example of a procedure of an operation of the machine learning device according to the second embodiment.

FIG. 11 is a flowchart illustrating an example of a procedure of an operation of the machine learning device 10 according to the second embodiment. First, it is assumed that the synchronous rotating machine 20 is rotated to any position and stopped. Thereafter, the state observation unit 11 observes a state variable (S11). The reward calculation unit 13 determines whether the driving noise of the synchronous rotating machine 20 is at a preset allowable level (S12).

If the reward calculation unit 13 determines that the driving noise of the synchronous rotating machine 20 is at the preset allowable level (Yes in S12), the reward calculation unit 13 increases a reward for the driving noise of the synchronous rotating machine 20 (S13). If the reward calculation unit 13 determines that the driving noise of the synchronous rotating machine 20 is not at the preset allowable level (No in S12), the reward calculation unit 13 decreases the reward for the driving noise of the synchronous rotating machine 20 (S14).

The reward calculation unit 13 determines whether the error with respect to the preset position of the rotational position of the synchronous rotating machine 20 satisfies a desired position error (S15). If the reward calculation unit 13 determines that the error with respect to the preset position of the rotational position of the synchronous rotating machine 20 satisfies the desired position error (Yes in S15), the reward calculation unit 13 increases a reward (S16). If the reward calculation unit 13 determines that the error with respect to the preset position of the rotational position of the synchronous rotating machine 20 does not satisfy the desired position error (No in S15), the reward calculation unit 13 decreases the reward (S17).

It is satisfactory as long as the reward calculation unit 13 executes at least one of a series of operations of step S12 to step S14 and a series of operations of step S15 to step S17. A step for giving a reward may be added in addition to those for diagnosing the driving noise and the position error.

Next, the function update unit 14 updates the function of formula (11) on the basis of the reward calculated by the reward calculation unit 13 (S18). The control parameter adjustment unit 15 updates the second command value which is a combination of the amplitude of the alternating-current voltage and the frequency of the alternating-current voltage (S19). For example, in the case of Q learning, the action value function $Q(s_t, a_t)$ expressed by the above formula (11) updated in step S18 is used as a function for determining the second command value. For example, the function update unit 14 obtains, in the process of learning, action at which maximizes the action value Q obtained with the action value function $Q(s_t, a_t)$ in the current state $s_t$, that is, the second command value. A known technique such as an ε-greedy algorithm can be used as a method of selecting action $a_t$. The driving of the synchronous rotating machine 20 is controlled using the updated second command value, and thereafter, the processes in step S11 to step S19 are repeated. On the other hand, when the action value function $Q(s_t, a_t)$ converges, the function update unit 14 selects the second command value which maximizes the action value Q obtained with the converged action value function $Q(s_t, a_t)$, and ends the adjustment of a control parameter of the synchronous rotating machine 20. A time point at which the action value Q is within a predetermined range may be set as a time point for ending the adjustment of the parameter.

In addition, when the action value function $Q(s_t, a_t)$ converges in the process in step S18, the action value function $Q(s_t, a_t)$ may be set as a learned model. The converged action value function $Q(s_t, a_t)$ can be used as a learned model by another device or the like.

As described above, the machine learning device 10 according to the second embodiment observes, as a state variable, at least one of the driving noise of the synchronous rotating machine 20 and the error with respect to the preset position of the rotational position of the synchronous rotating machine 20. The machine learning device 10 determines the value of the parameter used for outputting the second command value for estimating the rotational position of the synchronous rotating machine 20 on the basis of the state variable. Therefore, the machine learning device 10 can learn and output an optimum second command value without causing the user to input the value of the parameter used for outputting the second command value.

The state observation unit 11 may also observe moment of inertia of a machine connected to the synchronous rotating machine 20 as a state variable. In any case, on the basis of the state variable observed by the state observation unit 11, the learning unit 12 determines the value of the parameter used for outputting the second command value relating to a voltage used when the synchronous rotating machine 20 operates.

In addition, although the second command value which is a combination of the amplitude and the frequency of the high-frequency alternating-current voltage is used as action $a_t$ in the present embodiment, either one of the amplitude and the frequency of the high-frequency alternating-current voltage of the second command value may be used as action $a_t$, or parameters other than these may be included.

In the second embodiment, the case where the machine learning device 10 performs machine learning using reinforcement learning has been described. However, the machine learning device 10 may perform machine learning in accordance with other known methods, such as neural networks, genetic programming, functional logic programming, or support vector machines.

At least a part of functions of the state observation unit 11, the learning unit 12, and the control parameter adjustment unit 15 included in the machine learning device 10 according to the second embodiment may be realized by a processor equivalent to the processor 41 of the first embodiment. In the case where at least a part of the functions of the state observation unit 11, the learning unit 12, and the control parameter adjustment unit 15 is realized by the processor, the machine learning device 10 includes a memory for storing programs with which steps executed by at least a part of the state observation unit 11, the learning unit 12, and the control parameter adjustment unit 15 are executed as a result. The memory is a memory equivalent to the memory 42 of the first embodiment.

At least a part of the functions of the state observation unit 11, the learning unit 12, and the control parameter adjustment unit 15 included in the machine learning device 10 according to the second embodiment may be realized by processing circuitry equivalent to the processing circuitry 43 of the first embodiment.

The configurations described in the embodiments above are merely examples of the content of the present invention and can be combined with other known technology and part thereof can be omitted or modified without departing from the gist of the present invention.

REFERENCE SIGNS LIST 1 synchronous rotating machine control device; 2 control means; 3 input means; 4 storage means; 5 adjustment means; 6 addition means; 7 voltage application means; 8 current detection means; 10 machine learning device; 11 state observation unit; 12 learning unit; 13 reward calculation unit; 14 function update unit; 15 control parameter adjustment unit; 20 synchronous rotating machine; 31 MODE button; 32 dial; 33 display unit; 34 SET button; 41 processor; 42 memory; 43 processing circuitry; 81 detection unit; 82 coordinate converter.

The invention claimed is:

1. A machine learning device that determines a value of a parameter used for outputting a command value relating to a high-frequency voltage for estimating a position of a synchronous rotating machine, the high-frequency voltage having a frequency higher than a frequency of a driving voltage that drives the synchronous rotating machine, the machine learning device comprising:

a state observing circuit configured to observe, as a state variable, at least one of driving noise of the synchronous rotating machine and an error with respect to a preset position of a rotational position of the synchronous rotating machine, and a learning circuit configured to:
calculate a reward on a basis of the state variable; and
determine the value of the parameter on a basis of the reward, wherein the learning circuit increases the reward in a case that the driving noise is smaller than a target value of driving noise.

* * * * *